(12) United States Patent
Harris et al.

(10) Patent No.: US 9,092,115 B2
(45) Date of Patent: Jul. 28, 2015

(54) COMPUTING SYSTEM WITH VISUAL CLIPBOARD

(75) Inventors: Jonathan Harris, Redmond, WA (US); Andrew Allen, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 871 days.

(21) Appl. No.: 12/700,611

(22) Filed: Feb. 4, 2010

(65) Prior Publication Data

US 2011/0072344 A1 Mar. 24, 2011

Related U.S. Application Data

(60) Provisional application No. 61/245,237, filed on Sep. 23, 2009.

(51) Int. Cl.
*G06F 3/00* (2006.01)
*G06F 3/0481* (2013.01)
*G06F 3/0483* (2013.01)
*G06F 3/0486* (2013.01)
*G06F 3/0488* (2013.01)
*G06F 9/54* (2006.01)

(52) U.S. Cl.
CPC .......... *G06F 3/04817* (2013.01); *G06F 3/0483* (2013.01); *G06F 3/0486* (2013.01); *G06F 3/04883* (2013.01); *G06F 9/543* (2013.01); *G06F 2203/04803* (2013.01)

(58) Field of Classification Search
USPC .......... 715/702, 764, 761, 790, 792, 803, 804
See application file for complete search history.

(56) References Cited

U.S. PATENT DOCUMENTS

| | | | | |
|---|---|---|---|---|
| 5,301,268 A | * | 4/1994 | Takeda | 719/329 |
| 5,404,442 A | * | 4/1995 | Foster et al. | 715/769 |
| 5,542,040 A | * | 7/1996 | Chang et al. | 715/776 |
| 5,550,982 A | * | 8/1996 | Long et al. | 725/93 |
| 5,557,553 A | * | 9/1996 | Sellie, Sr. | 702/176 |

(Continued)

FOREIGN PATENT DOCUMENTS

| | | |
|---|---|---|
| JP | H11308592 A | 11/1999 |
| JP | 2003330733 A | 11/2003 |

(Continued)

OTHER PUBLICATIONS

"International Search Report", Mailed Date: Jun. 3, 2011, Application No. PCT/US2010/047060, Filed Date: Aug. 28, 2010, pp. 9.

(Continued)

*Primary Examiner* — Boris Pesin
*Assistant Examiner* — John Heffington
(74) *Attorney, Agent, or Firm* — Dan Choi; Judy Yee; Micky Minhas

(57) ABSTRACT

A visual clipboard system and method are provided, in which drag-and-release operations are employed to move copies of a displayed object onto and off of a predefined clipboard area. When a copy of a displayed object is placed on the predefined clipboard area, the displayed object is visually modified to indicate that the visually-modified copy is docked on the predefined clipboard area, and thus eligible for use in a copy operation. When a copy is removed from the predefined clipboard area and placed in a desired target location, the original appearance of the displayed object is restored.

18 Claims, 3 Drawing Sheets

(56) References Cited

U.S. PATENT DOCUMENTS

| | | | |
|---|---|---|---|
| 5,649,105 A * | 7/1997 | Aldred et al. | 709/220 |
| 5,689,666 A * | 11/1997 | Berquist et al. | 715/797 |
| 5,821,931 A * | 10/1998 | Berquist et al. | 715/784 |
| 5,897,650 A * | 4/1999 | Nakajima et al. | 715/202 |
| 5,926,633 A * | 7/1999 | Takagi et al. | 345/619 |
| 5,930,770 A * | 7/1999 | Edgar | 705/28 |
| 5,964,834 A * | 10/1999 | Crutcher | 709/213 |
| 6,097,391 A * | 8/2000 | Wilcox | 715/776 |
| 6,151,021 A * | 11/2000 | Berquist et al. | 715/764 |
| 6,177,935 B1 * | 1/2001 | Munn | 715/769 |
| 6,209,021 B1 * | 3/2001 | Ahimovic et al. | 709/204 |
| 6,331,840 B1 * | 12/2001 | Nielson et al. | 345/1.1 |
| 6,411,310 B1 * | 6/2002 | Berquist et al. | 715/764 |
| 6,421,733 B1 * | 7/2002 | Tso et al. | 709/246 |
| 6,437,807 B1 * | 8/2002 | Berquist et al. | 715/764 |
| 6,464,133 B1 * | 10/2002 | Gruber | 235/375 |
| 6,473,749 B1 * | 10/2002 | Smith et al. | 707/784 |
| 6,545,669 B1 * | 4/2003 | Kinawi et al. | 345/173 |
| 6,591,295 B1 * | 7/2003 | Diamond et al. | 709/217 |
| 6,643,124 B1 * | 11/2003 | Wilk | 361/679.04 |
| 6,753,888 B2 | 6/2004 | Kamiwada et al. | 715/782 |
| 7,056,217 B1 * | 6/2006 | Pelkey et al. | 463/43 |
| 7,503,008 B2 * | 3/2009 | Berquist et al. | 715/764 |
| 8,246,080 B1 * | 8/2012 | Bennett | 281/45 |
| 8,255,923 B2 * | 8/2012 | Youel et al. | 719/313 |
| 8,271,461 B2 * | 9/2012 | Pike et al. | 707/695 |
| 8,296,728 B1 * | 10/2012 | Webster | 717/109 |
| 8,608,478 B2 * | 12/2013 | Luster | 434/247 |
| 8,643,605 B2 * | 2/2014 | Yu et al. | 345/173 |
| 2001/0009420 A1 | 7/2001 | Kamiwada et al. | 345/629 |
| 2001/0023430 A1 * | 9/2001 | Srinivasan | 709/204 |
| 2002/0196284 A1 * | 12/2002 | Berquist et al. | 345/769 |
| 2003/0009603 A1 * | 1/2003 | Ruths et al. | 709/318 |
| 2003/0076364 A1 * | 4/2003 | Martinez et al. | 345/810 |
| 2003/0116619 A1 * | 6/2003 | Gruber | 235/375 |
| 2003/0182388 A1 * | 9/2003 | Alexander et al. | 709/213 |
| 2004/0146221 A1 * | 7/2004 | Siegel et al. | 382/305 |
| 2004/0150671 A1 * | 8/2004 | Kamiwada et al. | 345/782 |
| 2004/0224665 A1 * | 11/2004 | Kokubo | 455/411 |
| 2004/0225968 A1 * | 11/2004 | Look et al. | 715/778 |
| 2004/0226012 A1 * | 11/2004 | Awada et al. | 718/100 |
| 2004/0230907 A1 * | 11/2004 | Yang | 715/530 |
| 2005/0028008 A1 * | 2/2005 | Kumar | 713/200 |
| 2005/0066335 A1 * | 3/2005 | Aarts | 719/316 |
| 2005/0132273 A1 * | 6/2005 | Bodin et al. | 715/513 |
| 2005/0154784 A1 * | 7/2005 | Malcolm et al. | 709/213 |
| 2005/0231648 A1 * | 10/2005 | Kitamura et al. | 348/734 |
| 2005/0234864 A1 * | 10/2005 | Shapiro | 707/1 |
| 2005/0265548 A1 * | 12/2005 | Tsuchimura | 380/201 |
| 2006/0046239 A1 * | 3/2006 | Allen et al. | 434/353 |
| 2006/0085756 A1 * | 4/2006 | Srivastava et al. | 715/770 |
| 2006/0129944 A1 * | 6/2006 | Berquist et al. | 715/764 |
| 2006/0155578 A1 * | 7/2006 | Eisenberger et al. | 705/2 |
| 2006/0274086 A1 * | 12/2006 | Forstall et al. | 345/629 |
| 2006/0277460 A1 * | 12/2006 | Forstall et al. | 715/513 |
| 2006/0277481 A1 * | 12/2006 | Forstall et al. | 715/764 |
| 2007/0011749 A1 * | 1/2007 | Allison et al. | 726/26 |
| 2007/0079249 A1 * | 4/2007 | Pall et al. | 715/758 |
| 2007/0106952 A1 * | 5/2007 | Matas et al. | 715/764 |
| 2007/0118818 A1 * | 5/2007 | Gunderson et al. | 715/838 |
| 2007/0162842 A1 * | 7/2007 | Ambachtsheer et al. | 715/513 |
| 2007/0162845 A1 * | 7/2007 | Cave et al. | 715/530 |
| 2008/0005703 A1 * | 1/2008 | Radivojevic et al. | 715/863 |
| 2008/0058894 A1 * | 3/2008 | Dewhurst | 607/54 |
| 2008/0082932 A1 * | 4/2008 | Beumer | 715/770 |
| 2008/0109249 A1 * | 5/2008 | Paulson et al. | 705/1 |
| 2009/0025016 A1 * | 1/2009 | Crucs | 719/329 |
| 2009/0122329 A1 * | 5/2009 | Hegemier et al. | 358/1.9 |
| 2009/0140998 A1 * | 6/2009 | Jung et al. | 345/173 |
| 2009/0187842 A1 * | 7/2009 | Collins et al. | 715/769 |
| 2009/0309846 A1 * | 12/2009 | Trachtenberg et al. | 345/173 |
| 2009/0320052 A1 * | 12/2009 | Crucs | 719/329 |
| 2010/0005066 A1 * | 1/2010 | Howard et al. | 707/3 |
| 2010/0005067 A1 * | 1/2010 | Howard et al. | 707/3 |
| 2010/0005068 A1 * | 1/2010 | Howard et al. | 707/3 |
| 2010/0005119 A1 * | 1/2010 | Howard et al. | 707/104.1 |
| 2010/0005379 A1 * | 1/2010 | Lanahan et al. | 715/202 |
| 2010/0005380 A1 * | 1/2010 | Lanahan et al. | 715/204 |
| 2010/0217837 A1 * | 8/2010 | Ansari et al. | 709/218 |

FOREIGN PATENT DOCUMENTS

| | | | |
|---|---|---|---|
| JP | 2011070525 A | * | 4/2011 |
| JP | 2011253567 A | * | 12/2011 |
| RU | 2288512 C2 | | 11/2006 |

OTHER PUBLICATIONS

"iPhone Reference Library", Retrieved at <<http://developer.apple.com/IPhone/library/documentation/iPhone/Conceptual/iPhoneOSProgrammingGuide/EventHandling/EventHandling.html>> Jun. 17, 2009, pp. 18.

"How to Copy or Move Multiple Files" Retrieved at <<http://www.smartphonemag.com/cms/node/487>> Feb. 23, 2007, pp. 2.

"How to Copy and Paste on the iPhone [iPhone OS 3.0]", Retrieved at << http:iphonepk.net/2009/08/06/copy-paste-iphone-iphone-os-30/>> Aug. 6, 2009, pp. 4.

"How to Copy Multiple Items to Your Clipboard", Retrieved at <<http://www.jaystech.com/2008/02/how-to-copy-multiple-items-to-your.html>> Feb. 25, 2008, pp. 3.

"Copy and Paste Multiple Items by using the Office Clipboard", Retrieved at <<http://office.microsoft.com/en-us/sharepointdesigner/HA101636021033.aspx>> Aug 11, 2009, pp. 21.

"European Search Report", Application No. EP/10819215, Filed Date: May 29, 2012, pp. 3.

Russian Federal Service for Intellectual Property, Notice of Allowance Issued in Russian Patent Application No. 2012111050, Oct. 23, 2014, 14 pages.

Japanese Patent Office, Notice of Rejection Issued in Japanese Patent Application No. 2012-530901, Apr. 1, 2014, 6 Pages.

* cited by examiner

COMPUTING SYSTEM WITH VISUAL CLIPBOARD

CROSS REFERENCE TO RELATED APPLICATIONS

This application claims priority to U.S. App. Ser. No. 61/245,237, filed Sep. 23, 2009, the entirety of which is hereby incorporated herein by reference.

BACKGROUND

Various methods exist in computers and other electronic devices for copying, pasting and moving items. For example, the use of a simple clipboard mechanism for copying and pasting text and other items has been used in personal computers for quite some time. Although various improvements have been devised, current clipboard solutions are often limited in terms of flexibility and ease of use. In addition, many of the existing solutions do not take appropriate advantage of the enhanced interactivity that is offered through touch displays and other contemporary interface mechanisms.

SUMMARY

Accordingly, the present description provides a visual clipboard system and method in which a displayed object is placed onto a visual clipboard in response to a drag-and-release operation applied to the displayed object. Upon termination of the operation in a predefined clipboard area, a visually-modified version of the displayed object is generated and positioned in the predefined clipboard area. The visually-modified version of the displayed object is maintained in the predefined clipboard area until it is removed in response to another drag-and-release operation. In particular, in response to such an operation that terminates outside of the predefined clipboard area, the original appearance of the displayed object is restored and the displayed object is disposed in a target location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure relates to a visual clipboard for enabling copy, paste and/or move operations in an electronic device. All of these operations involve copying of an item, though they may sometimes be referred to as "move" or "paste" operations without specific reference to the copying step that enables the ultimate moving or pasting of the item in a new location.

Figure 1:
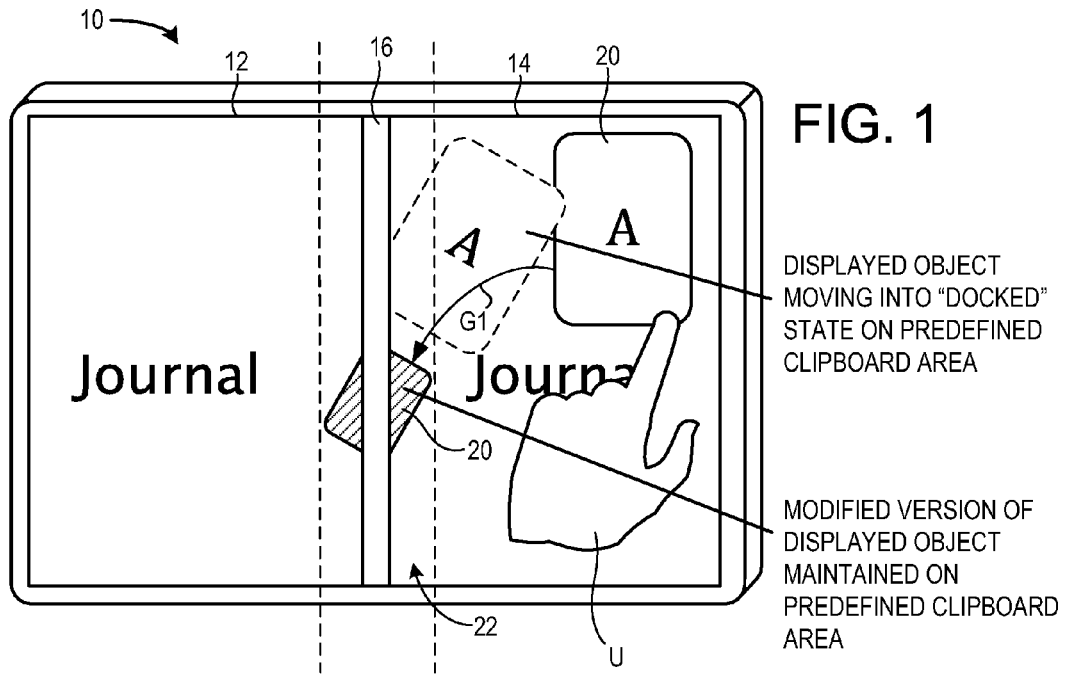
FIG. 1 is a depiction of an exemplary electronic device employing the visual clipboard functionality of the present description. The figure also depicts an exemplary placing of a selected object on the visual clipboard, so as to place a copy of the object in a docked state on the clipboard.
Figure 2:
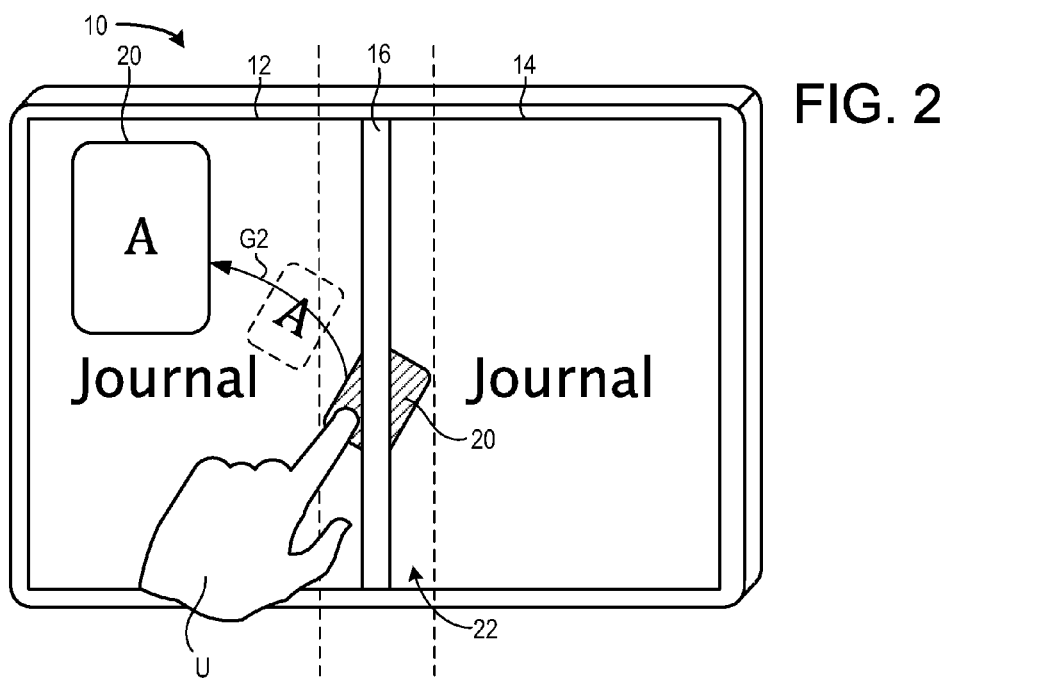
FIG. 2 depicts, with respect to the visual clipboard and selected object of FIG. 1, an exemplary removal (e.g., copy or move) of the copy of the selected object from the visual clipboard.
Figure 3:
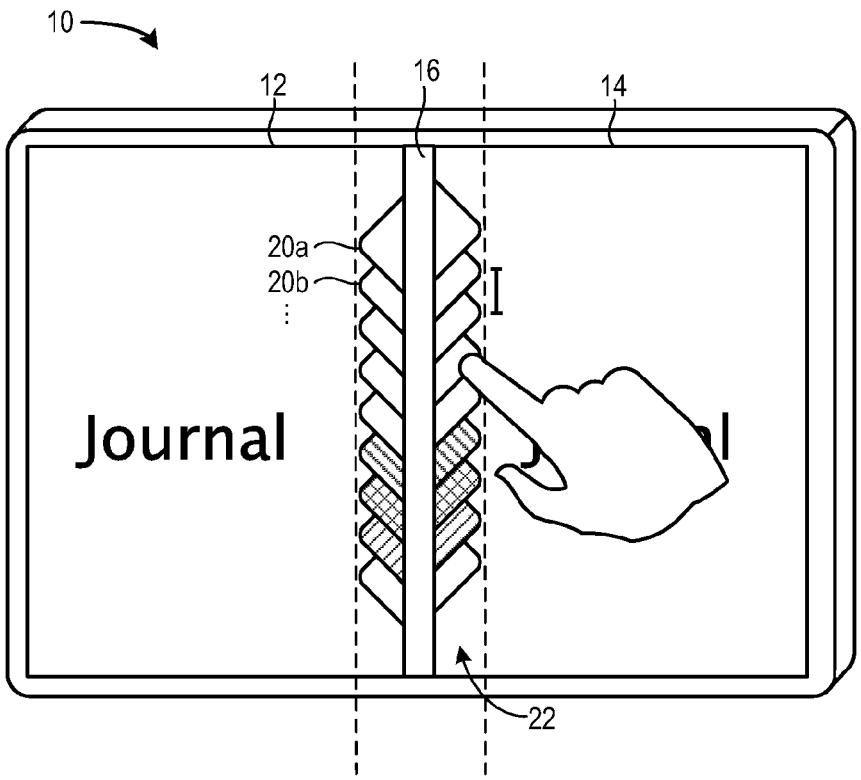
FIG. 3 depicts the exemplary device and visual clipboard of FIGS. 1 and 2, as used with multiple objects that may be selectively placed in and removed from the visual clipboard in copy operations.

FIGS. 1-3 depict an exemplary electronic device 10 with which the visual clipboard may be employed. Device 10 includes two display screens 12 and 14, which may be physically and/or virtually separated by an intervening separator 16, also referred to herein as a divider. In some embodiments, separator 16 is implemented to include a folding hinge which enables the two screens to be folded against one another, thereby providing the device with a note-book type form factor. Additional examples of such devices may be found in U.S. Ser. No. 12/410,303 entitled "Dual Screen Portable Touch Sensitive Computing System" and Ser. No. 12/410,311 entitled "Bimodal Touch Sensitive Digital Notebook", both filed on Mar. 24, 2009, the disclosures of which are incorporated herein by this reference, in their entireties and for all purposes. Various examples of the clipboard will be described in the context of device 10, though it will be readily appreciated that the described clipboard functionality may be used with a variety of other device types and form factors.

Referring to FIG. 1, the figure illustrates the placing of an object 20 on or into a visual clipboard 22, which in the present example is a predefined margin area or region defined near and on opposing sides of separator 16. Object 20 may be of virtually any type or format, or visual representation thereof, including a photograph or other image, file, icon, text, audio clip, video clip, grouping of items, etc.

Object 20 is placed on the visual clipboard 22 in response to a user input. In the present example, display screens 12 and 14 are touch-interactive. Accordingly, one method of placing an object onto clipboard 22 includes moving the object via a "drag-and-release" touchscreen gesture G1 applied by user U. In particular, the object may be dragged with a user's finger from its original location and released at a location on or within the area of visual clipboard 22. Initiating the operation may optionally including tapping, holding or performing some other action to place the object into an "editable" state allowing it to be moved or otherwise manipulated/edited. In any event, upon bringing the object into the region of the clipboard, the user would release the object, thereby causing the object to be placed on the clipboard. Alternatively, a menu item, button, mouse gesture or other actuator or interactive mechanism could be employed to place a selected object onto the visual clipboard.

In some cases, it may be desirable to provide a visual indication that a given object is being held on the visual clipboard. In FIG. 1, for example, object 20 is rotated and shown in a reduced size to indicate the object is "tucked" or "docked" (i.e., placed) onto the clipboard. Additionally, or alternatively, an item's status as being on the clipboard may be indicated via color, a specially-assigned icon, dimming, transparent representation, or any other appropriate indication.

In addition, an indication may be provided to the user that a given object is eligible or ready to be placed onto the clipboard. For example, upon reaching the region of the clipboard, but prior to release by the user's finger, the object may rotate, change color, shake/vibrate, and/or some other indication may be provided to indicate that a release of the object will result in its placement onto the clipboard. Furthermore, the availability of the clipboard may depend on the object being held in the clipboard region for a set amount of time (e.g., 2 seconds) before the clipboard is activated to allow the object to be docked.

The region comprising the visual clipboard may be defined and configured in various ways. The region may be placed adjacent on both opposing sides of a dual-screen separator, as in the example of FIGS. 1-3. In this arrangement, the icon or image representing a docked item may be partly visible on both of display screens 12 and 14. Alternatively, the clipboard region could be placed in other border regions of a screen, or on any other viewable portion of a display screen.

Various possibilities exist for indicating the presence of the clipboard functionality to the user. In one example, the clipboard region is defined in a region, but the region is not visually indicated on the display (or at least not until the region is used for clipboard functions). For example, the visual clipboard 22 of FIGS. 1-3 is defined by the region between the vertical dashed lines to either side of separator 16, however the region is not explicitly shown or otherwise visually delineated to the user. The presence of the region is known to the user, however (e.g., through tutorials or other communications about product features), and its existence and general shape/configuration can be discerned when objects are brought into the region, such as by dragging or other moving operations. Alternatively, the region's boundaries may be explicitly indicated to the user. In one example, the explicit indication is not provided until an object is brought near or into the clipboard region. In other examples, boundaries of the region are visually delineated to the user whether or not objects are near or on the clipboard.

FIG. 2 illustrates the removal of object 20 from visual clipboard 22. As previously indicated, the docking functionality may be configured so that the docked object appears partly on both sides of separator 16 and is therefore accessible from either screen 12 or 14. In the exemplary undocking operation of FIG. 2, docked object 20 is accessed via another drag-and-release touchscreen gesture G2 applied by user U. In this example, the gesture is applied to the portion of visual clipboard 22 located on screen 12 to the left of separator 16. Accordingly, it will be appreciated that a copy/move operation may be performed in which the source location is one of the display screens, with the destination location being on the other display screen. In any case, an additional gesture or operation may be employed to retrieve the object from the clipboard. For example, the user may need to rest his/her finger on the docked object for a predetermined time interval before being able to drag/remove the object from the clipboard. During movement to the desired destination, object 20 may remain in its diminished, rotated state, for example until it is released at its desired resting location. After placement at the desired location, the object may remain in an editable state, for example until the user "taps" the object or otherwise causes the object to transition to a non-editable state.

Also, as will be appreciated from the example of FIG. 2, undocking the object may also include restoring the object to its original appearance. In the specific example of FIG. 2, object 20 is returned to its original size and orientation after the drag-and-release operation has caused it to be placed in the desired target location.

During docking or undocking operations, differentiation may be employed to provide a user with the ability to selectively choose different clipboard operations. For example, in a bi-modal interactive system, one mode may be employed to provide a copy operation, while another mode provides a move operation. Referring particularly to the undocking operation of FIG. 2, accessing the docked item with a stylus or pen device could produce a copy of the object for positioning in a new location, while access with the user's finger could result in a move operation (i.e., leaving no copy behind in the clipboard).

Referring now to FIG. 3, visual clipboard 22 may be used to provide copy/paste and/or move functionality for multiple objects 20 (i.e., object 20a, 20b, etc.). When multiple objects are placed on the clipboard, various methods may be employed to position the objects on the clipboard, relative to one another and to other portions of the display screen or screens. For example, placement routines may be employed to take into account some or all of the following criteria/factors:

User intent: i.e., routine(s) may be employed to attempt to retain the object docked in the location where it was placed by the user Spatial distribution: i.e., routines may be employed to achieve uniform or other spatial distributions of multiple objects placed on the clipboard Placement/positioning may be predicated on when objects were docked, object type, filename, object date, etc.

Accessibility: i.e., sizing and positioning objects to facilitate access via finger touch or other means In addition to the benefits and advantages recited above, the described visual clipboard may provide the following benefits and advantages, depending upon the particulars of a given implementation:

The ability to copy and paste and move multiple objects via touch gestures: In particular, multiple object functionality may be facilitated by objects retaining aspects of their appearance when placed in the "docked" state on the visual clipboard. Accordingly, when multiple objects are docked on the clipboard, a user may more easily select a desired object for withdrawal.

The ability to drag objects into and out of a holding place on screen

The ability to transfer objects from one screen to another via an on-screen holding location The ability to move objects to the spine region of a dual-screen display, and hold the objects there for later use: For example, a notebook form factor device might employ such a spin region. Docked items could be retained near the spine region while the user navigated through a plurality of pages in order to find a desired target page on which to place one of the docked items. Upon finding the desired target page and causing it to be displayed on one of the screens, the desired docked item could be withdrawn and placed in a desired location on the newly-displayed screen. In this example, the ability to move one or more items to new, "distant" source locations is enhanced by use of the described visual clipboard.

In addition, the docked objects typically are maintained on the predefined clipboard area during navigation or other modification to content displayed on the one or more adjoining display screens. In particular, user navigation commands may be employed in the depicted notebook form factor device to step through a sequence of content pages. This flipping of content pages may occur in order for the user to select a desired target location (e.g., a page) to place a copy of an object that has been placed on the clipboard.

Figure 4:
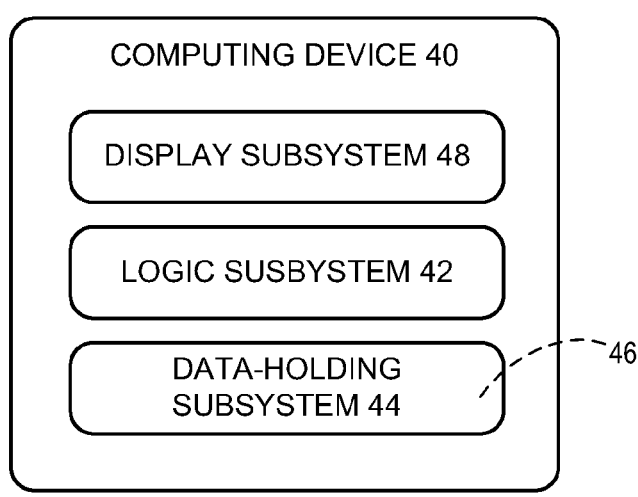
FIG. 4 is an exemplary computing device that may be used in connection with or to provide the visual clipboard functionality of the present description.

From the above, it should be understood that the present disclosure also encompasses a visual clipboard method. In some cases, as shown in the example of FIG. 4, such a method may be employed in connection with the execution of interface instructions 46 stored on a data-holding subsystem 44 of a computing device 40. In such a case, a processor or other logic subsystem 42 may be employed in connection with executing the instructions to perform copy/move operations of items displayed on display subsystem 48. It should be appreciated that computing device 40 is a generalized example of a device which may employ the visual clipboard functionality described herein, and in specific implementations the device may include various features of the examples discussed with reference to FIGS. 1-3.

When included in the present examples, a logic subsystem (e.g., logic subsystem 42) may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

When included in the present examples, a data-holding subsystem (e.g., data-holding subsystem 44) may include one or more physical devices configured to hold data and/or instructions executable by the logic subsystem to implement the herein described methods and processes. When such methods and processes are implemented, the state of data-holding subsystem may be transformed (e.g., to hold different data). The data-holding subsystem may include removable media and/or built-in devices. The data-holding subsystem may include optical memory devices, semiconductor memory devices, and/or magnetic memory devices, among others. The data-holding subsystem may include devices with one or more of the following characteristics: volatile, non-volatile, dynamic, static, read/write, read-only, random access, sequential access, location addressable, file addressable, and content addressable. In some embodiments, a logic subsystem and data-holding subsystem may be integrated into one or more common devices, such as an application specific integrated circuit or a system on a chip. The data-holding subsystem may also be in the form of computer-readable removable media, which may be used to store and/or transfer data and/or instructions executable to implement the herein described methods and processes.

When included, a display subsystem (e.g., display subsystem 48) may be used to present a visual representation of data held by a data-holding subsystem. As the herein described methods and processes change the data held by the data-holding subsystem, and thus transform the state of the data-holding subsystem, the state of the display subsystem may likewise be transformed to visually represent changes in the underlying data. The display subsystem may include one or more display devices utilizing virtually any type of technology. Such display devices may be combined with a logic subsystem (e.g., logic subsystem 42) and/or a data-holding subsystem (e.g., data-holding subsystem 44) in a shared enclosure, or such display devices may be peripheral display devices.

Figure 5:
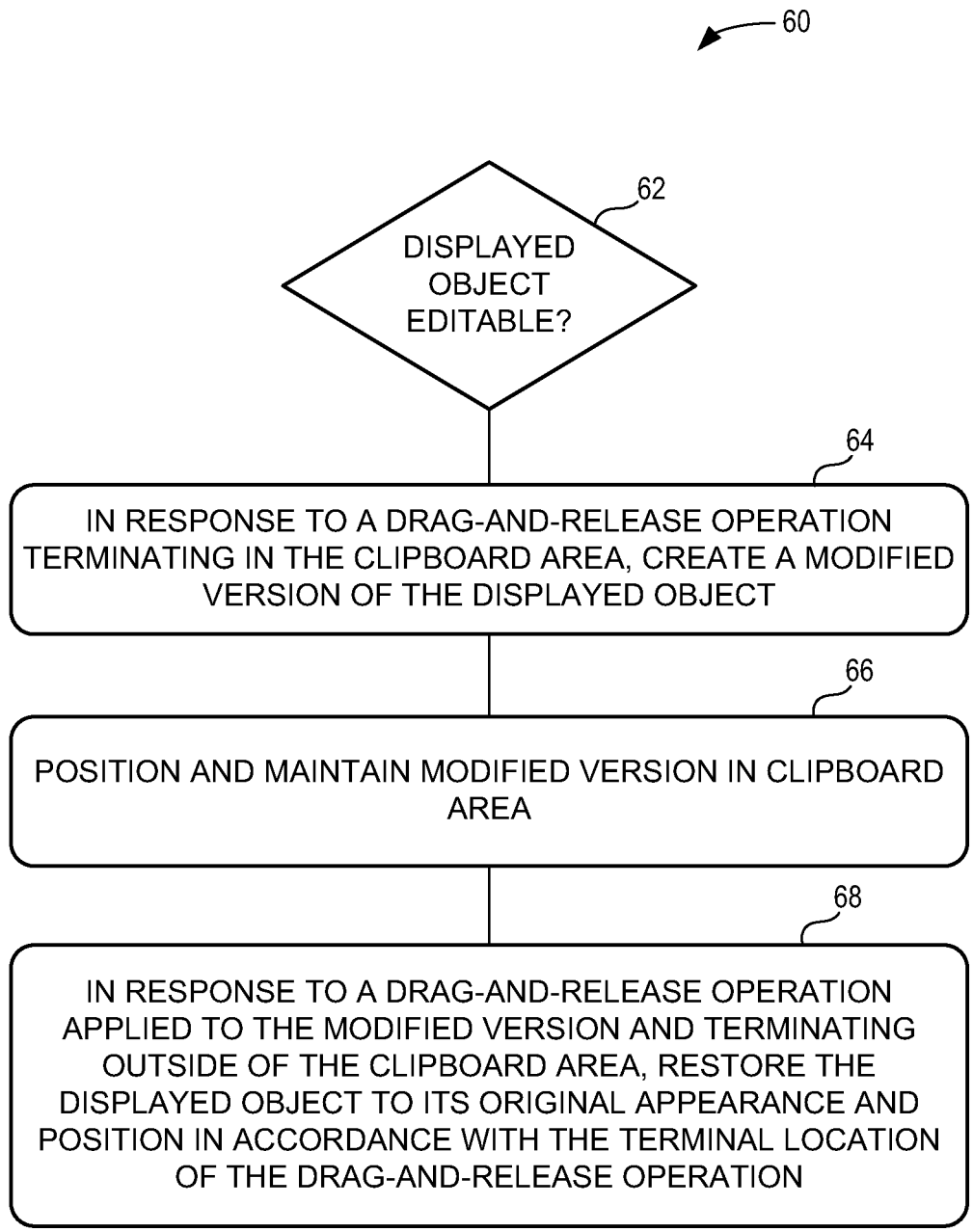
FIG. 5 depicts an exemplary visual clipboard method.

FIG. 5 depicts an exemplary method 60 that may be employed to provide visual clipboard functionality. In the context of an object that is displayed on a display screen, the method may include first determining whether the object is editable and therefore able to be copied, moved, etc., as shown at 62. As previously discussed, an object may be made editable through various actions. One example includes the user tapping or otherwise selecting the displayed object. Then, as shown at 64, a user input may be received in the form of a drag-and-release operation, such as a touchscreen gesture. If the drag-and-release operation terminates within the clipboard area (e.g., a predefined margin area of a display screen), then a visually-modified version of the display object is generated and positioned within the clipboard area, as shown at 66. As discussed above, the modification may include rotation, size variation, dimming, transparent appearance, special coloration, etc. In general, however, it will often be desirable that the modified version be similar in many respects to the original (e.g., similar shape and other details). This may be particularly useful in implementations where multiple items are "docked" on the clipboard area. Retaining aspects of the original appearance of the object can facilitate the user selecting the correct desired object when multiple objects are present.

Continuing with exemplary method 60, step 68 illustrates an example of how the copy/move operation is completed by removing a docked item from the clipboard area. In particular, in response to a drag-and-release operation applied to a docked item (i.e., a modified version of a displayed object that is positioned on the clipboard) and that terminates outside the clipboard area, the docked item is restored to its original unmodified appearance and placed in a target location. Typically, the target location is determined by where the undocking gesture terminates (e.g., where the user lifts/releases his/her finger to "let go" of the item being manipulated).

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A visual clipboard method, comprising:
   simultaneously displaying content pages on adjoining display screens;
   in response to a first drag-and-release operation that is applied to a displayed object and that terminates in a predefined clipboard area of the adjoining display screens, creating a visually-modified version of the displayed object and positioning the visually-modified version in the predefined clipboard area, the visually-modified version of the displayed object retaining one or more aspects of an original appearance of the displayed object, the predefined clipboard area being a predefined margin area defined on two opposing sides of a divider interposed between two display screens of a computing device having a notebook form factor;

in response to user navigation commands, stepping through a sequence of displayable content pages and causing display of a selected content page on the adjoining display screens;

maintaining the visually-modified version of the displayed object in the predefined clipboard area in a visible state during said stepping through the sequence of displayable content pages to flip through the content pages; and in response to a second drag-and-release operation that is applied to the visually-modified version of the displayed object and that terminates on the selected content page outside of the predefined clipboard area, restoring the original appearance of the displayed object and positioning said restoration in a location on the selected content page.

2. The method of claim 1, where the first drag-and-release operation is a touchscreen gesture applied to a first one of the two display screens and the second drag-and-release operation is a touchscreen gesture applied to a second one of the two display screens.

3. The method of claim 1, further comprising, for each of a plurality of different displayed objects, positioning and maintaining the visually-modified version of the displayed object in the predefined clipboard area to selectively enable copy operations for the plurality of different displayed objects.

4. The method of claim 1, where said creating step and said positioning step include placing a smaller version of the displayed object in the predefined clipboard area.

5. The method of claim 1, where said creating step and said positioning step include placing a rotated version of the displayed object in the predefined clipboard area.

6. The method of claim 1, where said creating step and said positioning step include placing a dimmer version of the displayed object in the predefined clipboard area.

7. The method of claim 1, where the predefined clipboard area is visibly indicated on the adjoining display screens.

8. A computing device with visual clipboard functionality, comprising:
    a display subsystem including adjoining display screens;
    a logic subsystem; and
    a data-holding subsystem operatively coupled with the display subsystem and the logic subsystem; the data-holding subsystem containing interface instructions executable by the logic subsystem to:
        simultaneously display content pages on adjoining display screens;
        in response to a first drag-and-release operation that is applied to a displayed object and that terminates in a predefined clipboard area of the adjoining display screen of the display subsystem, create a visually-modified version of the displayed object and position the visually-modified version in the predefined clipboard area, the visually-modified version of the displayed object retaining one or more aspects of an original appearance of the displayed object, the predefined clipboard area being a predefined margin area defined on two opposing sides of a divider interposed between two display screens of a computing device having a notebook form factor;
        in response to user navigation commands, step through a sequence of displayable content pages and causing display of a selected content page on the display screen to flip through the content pages;
        maintain the visually-modified version of the displayed object in the predefined clipboard area in a visible state during said stepping through the sequence of displayable content pages to flip through the content pages; and
        in response to a second drag-and-release operation that is applied to the visually-modified version of the displayed object and that terminates outside of the predefined clipboard area, restore the original appearance of the displayed object and position said restoration in a location determined by where the second drag-and-release operation is terminated.

9. The computing device of claim 8, where the computing device has the notebook form factor, in which the display subsystem includes two display screens that are foldably coupled with one another.

10. The computing device of claim 8, where the interface instructions are configured to enable a copy operation in which the first drag-and-release operation is applied to one of the two display screens, with the second drag-and-release operation being applied to the other of the two display screens.

11. The computing device of claim 8, where the interface instructions are configured to create a smaller version of the displayed object and position said smaller version in the predefined clipboard area.

12. The computing device of claim 8, where the interface instructions are configured to create a rotated version of the displayed object and position said rotated version in the predefined clipboard area.

13. The computing device of claim 8, where the interface instructions are configured to create a dimmer version of the displayed object and position said dimmer version in the predefined clipboard area.

14. A computing device with visual clipboard functionality, comprising:
    a display subsystem including two display screens foldably coupled with one another and separated by a divider;
    a logic subsystem; and
    a data-holding subsystem operatively coupled with the display subsystem and the logic subsystem, the data-holding subsystem containing interface instructions executable by the logic subsystem to:
        simultaneously display content pages on adjoining display screens;
        define a visual clipboard including portions adjacent to and on opposing sides of the divider;
        in response to a first drag-and-release operation that is applied to a displayed object and that terminates in the visual clipboard, create a visually-modified version of the displayed object and position the visually-modified version in the visual clipboard such that portions of the visually-modified version are displayed on both sides of the divider, the visual clipboard being a predefined margin area defined on two opposing sides of the divider;
        in response to user navigation commands, step through a sequence of displayable content pages and causing display of a selected content page on the display screen to flip through the content pages;
        maintain the visually-modified version of the displayed object in the predefined margin area in a visible state during said stepping through the sequence of displayable content pages to flip through the content pages; and
        in response to a second drag-and-release operation that is applied to the visually-modified version of the displayed object and that terminates outside of the predefined margin area, restore an original appearance of the displayed object and position said restoration in a location determined by where the second drag-and-release operation is terminated.

15. The computing device of claim 14, where the interface instructions are configured to enable a copy operation in which the first drag-and-release operation is applied to one of two display screens, with the second drag-and-release operation being applied to the other of the two display screens.

16. The computing device of claim 14, where the interface instructions are configured to create a smaller version of the displayed object and position said smaller version in the predefined margin area.

17. The computing device of claim 14, where the interface instructions are configured to create a rotated version of the displayed object and position said rotated version in the predefined margin area.

18. The computing device of claim 14, where the interface instructions are configured to create a dimmer version of the displayed object and position said dimmer version in the predefined margin area.

* * * * *